Oct. 1, 1940.  C. STANSBURY  2,216,329
CIRCUIT CONTROLLER
Filed May 2, 1938
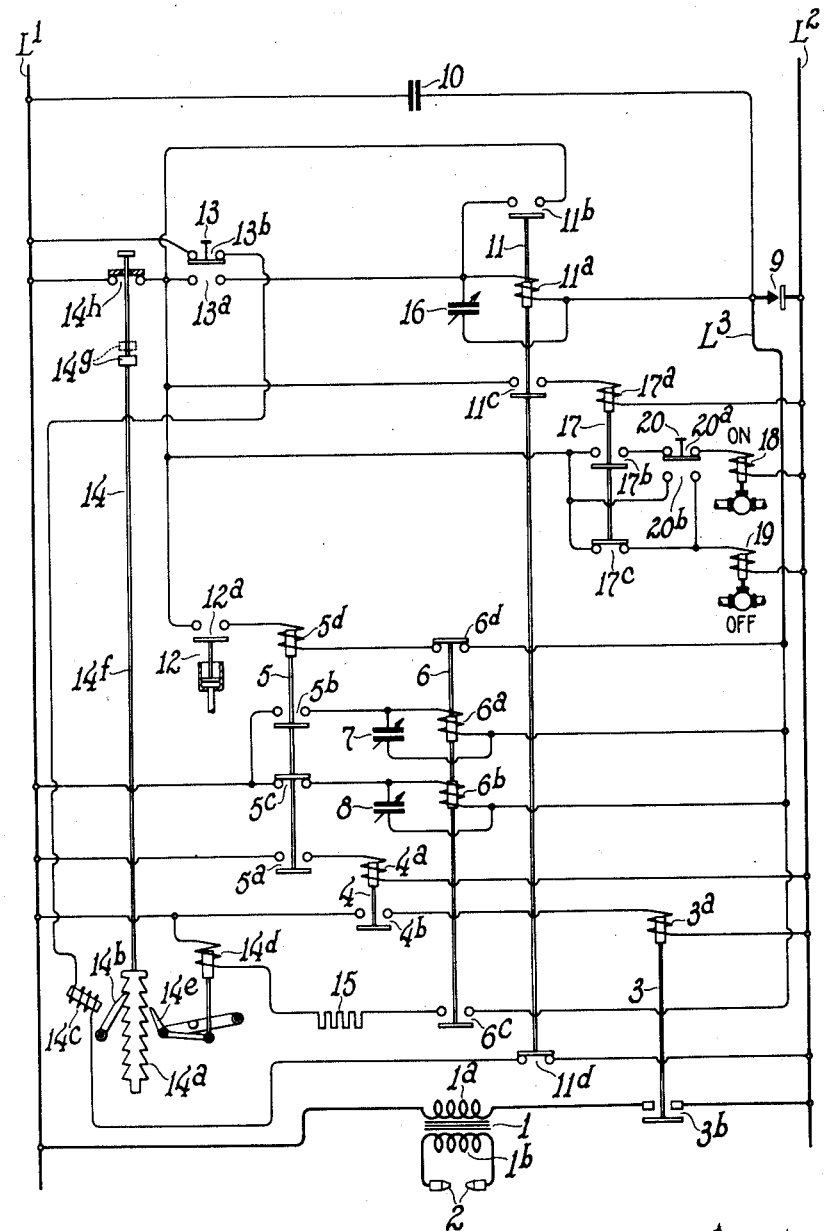
Inventor
Carroll Stansbury
By Frank H. Hubbard
Attorney Patented Oct. 1, 1940

2,216,329

UNITED STATES PATENT OFFICE 2,216,329

CIRCUIT CONTROLLER

Carroll Stansbury, Wauwatosa, Wis., assignor to Cutler-Hammer, Inc., Milwaukee, Wis., a corporation of Delaware Application May 2, 1938, Serial No. 205,492

5 Claims. (Cl. 175—320)

REISSUED

AUG 10 1943

This invention relates to a circuit controller, and more particularly to a resistance welding controller by means of which it is possible to apply the welding current to an individual spot to be welded an adjustable number of times in rapid succession.

In spot welding metals it is desired to apply to a spot which is to be welded a relatively large current for a very short time so that the energy which is dissipated in the weld is concentrated as much as possible in the spot and that dissipation of energy into the surrounding metal and the resulting heating thereof is held down to a minimum. This is particularly necessary when welding materials the physical characteristic of which is unfavorably affected by heat. By concentrating the heating effect of the welding current to the weld undesirable changes in the structure of the material adjacent to the weld are avoided.

With very heavy material the amount of energy thus required must all be supplied in a very short period of time and the transformer which supplies the energy must therefore have a very large current capacity in order not to cause too great a drop of the welding voltage which would tend to reduce the effectiveness of the welding operation. The electrodes also heat up unduly and tend to fuse to the material to be welded. In order to overcome these disadvantages the present system provides for the supply of the total energy necessary to produce the weld in a series of current impulses of relatively low magnitude. This permits the heat developed in the electrodes themselves to be dissipated by the cooling medium of the electrodes and the cool electrodes in turn absorb the heat diffused to the surface of the metal and which is not consumed in softening and melting the metal at the interface between the two parts to be welded. Thus undesirable changes in the structure of the welded material beyond the weld are avoided. The repeated application of the welding current takes place in rapid succession, while the number of applications of welding current as well as the duration of the individual shots and the interval between successive shots may be regulated to suit particular requirements and the capacity of the welding transformer.

An object of the invention is to provide a welding controller for applying an adjustable number of current impulses to a weld.

Another object is to provide a controller of the aforementioned type by which the duration of the individual impulses and the intervals between impulses are individually adjustable.

Another object is to provide an improved electromagnet repeating mechanism suitable for such welding control and other purposes.

The accompanying drawing illustrates diagrammatically a system incorporating the present invention.

Referring to the drawing the system is supplied with current from bus bars of an alternating current source, represented by lines $L^1$ and $L^2$, which furnish welding current to a transformer 1 having a primary winding $1^a$ and a secondary winding $1^b$. The secondary winding $1^b$ is connected to the welding electrodes 2. In series with the primary winding $1^a$ are the normally open contacts $3^b$ of the magnet switch 3 which has a magnetizing winding $3^a$. The winding $3^a$ is connected across the lines $L^1$ and $L^2$ in series with normally open contacts $4^b$ of an electromagnetic relay 4 which is provided with an operating winding $4^a$. The winding $4^a$ in turn is connected across the lines $L^1$ and $L^2$ through normally open contacts $5^a$ of an electromagnetic relay 5 which relay is further provided with normally open contacts $5^b$, normally closed contacts $5^c$ and an operating winding $5^d$. The normally open contact $5^b$ connects a closing winding $6^a$ of an electromagnetic switch 6 across lines $L^1$ and $L^3$, while an opening or lockout winding $6^b$ of switch 6 is energized from the lines $L^1$ and $L^3$ when the contact $5^c$ is closed. Relay 6 is equipped with a normally open contact $6^c$ and a normally closed contact $6^d$. The operating winding $6^a$ is paralleled by an adjustable condenser 7 while the lockout winding $6^b$ is paralleled by an adjustable condenser 8.

The aforementioned line or bus bar $L^3$ is connected to the bus bar $L^2$ through a rectifier 9 of any suitable type. Thus the bus bars $L^1$ and $L^3$ form the terminals of a direct current supply which receives its energy from the alternating current source through the rectifier 9. In the present system a half wave rectifier 9 is shown but it is obvious that a full wave rectifier may be employed in order to smooth out the voltage variations due to the half wave rectification. In the system represented by the drawing the voltage fluctuations are smoothed out by a condenser 10 of suitable capacity which is connected between the bus bars $L^1$ and $L^3$. This condenser maintains the direct current voltage at a substantially constant value in a well known manner.

The system also further includes a relay 11 having an energizing winding 11ª, normally open contacts 11ᵇ and 11ᶜ and normally closed contacts 11ᵈ. A pressure operated switch 12 actuated from the hydraulic system which also controls the movement of the welding electrodes 2 in a well known manner is provided with normally open contacts 12ª which contacts close when the pressure in the system and hence between the electrodes reaches a certain value. There is provided a pilot push button 13 having normally open contacts 13ª and normally closed contacts 13ᵇ. This push button is manually controlled by the operator and is depressed when it is desired to produce a weld.

To regulate the number of current impulses which are delivered to an individual weld a relay 14 is provided. The relay 14 has a ratchet 14ª which is engaged by a pawl 14ᵇ. The pawl may be released by energization of an electromagnetic winding 14ᶜ whereupon the relay drops by gravity. A solenoid winding 14ᵈ when energized operates a ratchet pawl 14ᵉ which engages with ratchet 14ª and lifts the ratchet by one tooth at a time. When the coil 14ᵈ is deenergized the pawl 14ᵉ is moved out of engagement with the ratchet 14ª, but the ratchet is held in the position to which it has been moved by engagement with the pawl 14ᵇ. An extension 14ᶠ of the ratchet is provided with an adjustable collar 14ᵍ which in the highest position of the ratchet engages the bridging contact of normally closed contacts 14ʰ and opens said contacts. The winding 14ᵈ may be connected in series with a resistor 15 and the normally open switch 6ᶜ across the lines L¹ and L³. There is also a circuit from the line L¹ through the normally closed contact 13ᵇ, the winding 14ᶜ and normally closed contacts 11ᵈ to line L². Another circuit extends from the line L¹ through normally closed contacts 14ʰ, normally open contacts 13ª, winding 11ª to line L³. Winding 11ª is paralleled by an adjustable condenser 16. Normally open contacts 13ª are paralleled by the normally open contact 11ᵇ.

A relay 17 has an energizing winding 17ª which may be connected in series with contact 14ʰ and contact 11ᶜ across the lines L¹ and L². The relay 17 has normally open contacts 17ᵇ and normally closed contacts 17ᶜ. The hydraulic cylinder which operates the welding electrodes (not shown) is controlled by two valves, an "on" valve which moves the electrodes to closed position and which is controlled by an electromagnet 18 and an "off" valve which is controlled by an electromagnet 19. The "on" magnet 18 is connected in series with the normally closed contacts 20ª of an emergency push button switch 20 which is also provided with normally open contacts 20ᵇ. A circuit extends from line L¹ through contacts 14ʰ, contacts 17ᵇ, contacts 20ª, through winding 18 to line L², while a second circuit extends from line L¹ through contact 14ʰ, contact 20ᵇ or contact 17ᶜ through winding 19 of the "off" valve to line L².

The operation is as follows: When the system is at rest the apparatus is in the position shown in the diagram except that normally the relay 14 is in its lowermost position. Therefore a circuit is established from line L¹ through contact 14ʰ, contact 17ᶜ, coil 19 to line L². The "off" valve is therefore open and the electrodes 2 are separated by the hydraulic system. Current is supplied to bus bar L³ through the rectifier 9. It will be observed that in the inoperative position the contact 13ᵇ of the push button switch 13 is closed so that a circuit is completed from the line L¹ through contact 13ᵇ, operating coil 14ᶜ, contact 11ᵈ to line L². This energizes the winding 14ᶜ releasing the latch 14ᵇ, so that the relay 14 drops to its lowermost position.

If now the operator wishes to start the equipment he momentarily presses the button 13 and circuit is thereby established from the line L¹ to contacts 14ʰ, 13ª, operating coil 11ª to line L² through rectifier 9 and the relay 11 is energized thereby opening the normally closed contact 11ᵈ and closing the normally open contacts 11ᵇ and 11ᶜ. The closure of the contact 11ᵇ establishes a maintaining circuit for the relay coil 11ª so that the latter remains energized independently of the contact 13ª as long as the contact 14ʰ is closed. Circuit is also established from the line L¹ through contact 14ʰ, contact 11ᶜ, coil 17ª to line L². This energizes relay 17 and opens contact 17ᶜ and closes contact 17ᵇ. The opening of contact 17ᶜ deenergizes the "off" valve of the hydraulic system and energizes coil 18 thereby operating the "on" valve of the hydraulic system so that pressure is applied to close the electrodes 2. At the same time contact 11ᵈ is open thereby deenergizing coil 14ᶜ and permitting the latch 14ᵇ to engage the ratchet 14ª.

After the electrodes 2 have closed and produced sufficient pressure on the material to be welded the pressure switch 12 closes the contact 12ª. This energizes the winding 5ᵈ thereby opening the normally closed contact 5ᶜ and closing the normally open contact 5ᵇ. As long as the contact 5ᶜ is closed the coil 6ᵇ is energized thereby opposing the lifting of the relay 6. When contact 5ᶜ is open the coil 6ᵇ is deenergized but the current therein will not die out instantaneously but will continue to flow for some time due to the action of the condenser 8 and thus will resist the operation of relay 6. The duration of this resisting force depends upon the adjustment of the condenser 8. At the same time that coil 6ᵇ is deenergized coil 6ª will be energized and after the pull of the coil 6ᵇ has been reduced a sufficient amount the coil 6ª will pull the relay 6 upward thereby closing contact 6ᶜ and energizing coil 14ᵈ of the ratchet solenoid. The solenoid will operate and lift the relay 14 by one tooth of the ratchet. At the same time contact 6ᵈ is opened thereby deenergizing the relay 5 and this causes deenergization of the coil 6ª and energization of the coil 6ᵇ. The relay 6 however cannot drop immediately due to the delayed decay of the flux in the coil 6ª, the time of which is determined by the adjustment of the condenser 7. After the expiration of some time the magnetism produced by the coil 6ª is insufficient to hold the coil in its upper position and the relay will drop again. The dropping of the relay opens the contact 6ᶜ thereby deenergizing the magnet 14ᵈ and the pawl of the ratchet 14ᵉ drops out of engagement with the ratchet 14ª, but the relay 14 will not drop back to its initial position as it is held by the engaged latch 14ᵇ.

It will be observed that every time the relay 5 is raised to its uppermost position it closes contact 5ª which energizes coil 4ª of relay 4 thereby closing contact 4ᵇ which controls the coil 3ª of main switch 3. Thus upon each energization of the relay 5 the main switch 3 closes the primary circuit of the transformer through the contacts 3ᵇ and permits a current impulse through the welding transformer. This cycle is repeated until the collar 14ᵍ engages the contact 14ʰ whereupon the latter contact is opened thereby causing deenergization of the coil 11ª and the resultant closure of contact 11ᵈ. As the push button switch 13 is in its released position the coil 14ᶜ of the latch 14ᵇ is energized permitting the relay 14 to drop back to its initial position. The opening of the contact 14ʰ also deenergizes the relay 17 so that the latter causes energization of the "off" magnet of the hydraulic system and deenergization of the "on" magnet thus returning the electrodes 2 to the off position and releasing the work piece. The opening of the contact 14ʰ of course also discontinues power supply to the relays 5 and 6 so that the alternate operation thereof and the resulting energization of the main switch 2 and of the ratchet coil 14ᵈ ceases. By adjustment of the collar 14ᵍ the number of current impulses during a cycle can be adjusted as is obvious.

If during an operating cycle the operator should desire to interrupt the working of the machine he may press the push button 20 thereby opening the circuit of the "on" solenoid and closing the circuit of the "off" solenoid, thus causing release of the work piece by the electrodes. This operation of course also causes opening of the switch 12ᵃ due to the decrease of the pressure in the hydraulic cylinder which operates the electrodes and this in turn causes interruption of the cycle of the main switch. If the button 20 is again released the cycle is completed as heretofore explained.

What I claim as new and desire to secure by Letters Patent is:

1. In combination, a reciprocating mechanism comprising two electromagnets adapted to be alternately connected to a circuit to effect reciprocation of said mechanism, electrostatic means effective to maintain energization of each of said magnets for a temporary period after its disconnection from said circuit, an electromagnetic relay normally biased to one position and having a switch for effecting the connection to said circuit of one of said electromagnets in said one position and interrupting it in another position and having another switch for interrupting the connection to said circuit of the other of said magnets in said one position and completing it in said other position, and a contact for energizing said electromagnetic relay to move it to said other position, said last contact being biased to its closed position by said mechanism when the latter is near its one limit of travel.

2. In a controller for controlling an adjustable number of current impulses supplied to a translating circuit whereby the duration of the impulse and the interval between impulses are individually adjustable, in combination, a reciprocating mechanism comprising two electromagnets adapted to be alternately connected to a circuit to effect reciprocation of said mechanism, electrostatic means effective to maintain energization of each of said magnets for a temporary period after its disconnection from said circuit, means to connect said magnets alternately to said circuit and then disconnecting each upon connection of the other, said mechanism under the influence of said electrostatic means, having a minimum time element incident to each reciprocation without dependence therefor upon said last mentioned means, and switch means for opening and closing a translating circuit in response to the reciprocations of said mechanism.

3. In a controller for controlling an adjustable number of current impulses supplied to a translating circuit, whereby the duration of the impulse and the interval between impulses are individually adjustable in combination, a reciprocating mechanism comprising two electromagnets adapted to be alternately connected to a circuit to effect reciprocation of said mechanism, electrostatic means effective to maintain energization of each of said magnets for a temporary period after its disconnection from said circuit, an electromagnetic relay normally biased to one position and having a switch for effecting the connection to said circuit of one of said electromagnets in said one position and interrupting it in another position and having another switch for interrupting the connection to said circuit of the other of said magnets in said one position and completing it in said other position, a contact for energizing said electromagnetic relay to move it to said other position, said contact being biased to closed position by said mechanism when the latter is near its one limit of travel, and a control switch in a translating circuit actuated by said relay.

4. In a controller for controlling an adjustable number of current impulses supplied to a translating circuit, whereby the duration of the impulse and the interval between impulses are individually adjustable in combination, a reciprocating mechanism comprising two electromagnets adapted to be alternately connected to a circuit to effect reciprocation of said mechanism, electrostatic means effective to maintain energization of each of said magnets for a temporary period after its disconnection from said circuit, means to connect said magnets alternately to said circuit and then disconnecting each upon connection of the other, said mechanism under the influence of said electrostatic means, having a minimum time element incident to each reciprocation without dependence therefor upon said last mentioned means, switch means for opening and closing a translating circuit in response to the reciprocations of said mechanism, and means responding to a given number of cycles of operation of said reciprocating mechanism to terminate the current supplied to said mechanism and said switch means.

5. In a controller for controlling an adjustable number of current impulses in a translating circuit, whereby the duration of the impulse and the interval between impulses are individually adjustable in combination, a reciprocating mechanism comprising two electromagnets adapted to be alternately connected to a circuit to effect reciprocation of said mechanism, electrostatic means effective to maintain energization of each of said magnets for a temporary period after its disconnection from said circuit, an electromagnetic relay normally biased to one position and having a switch for effecting the connection to said circuit of one of said electromagnets in said one position and interrupting it in another position and having another switch for interrupting the connection to said circuit of the other of said magnets in said one position and completing it in said other position, a contact for energizing said electromagnetic relay to move it to said other position, said contact being biased to closed position by said mechanism when the latter is near its one limit of travel, a control switch in a translating circuit actuated by said relay, and means responding to a given number of cycles of operation of said reciprocating mechanism to terminate the current supply to said mechanism and said control switch.

CARROLL STANSBURY.